March 21, 1933.　　C. A. KOPP　　1,902,171
SEPTIC TANK
Filed July 18, 1932
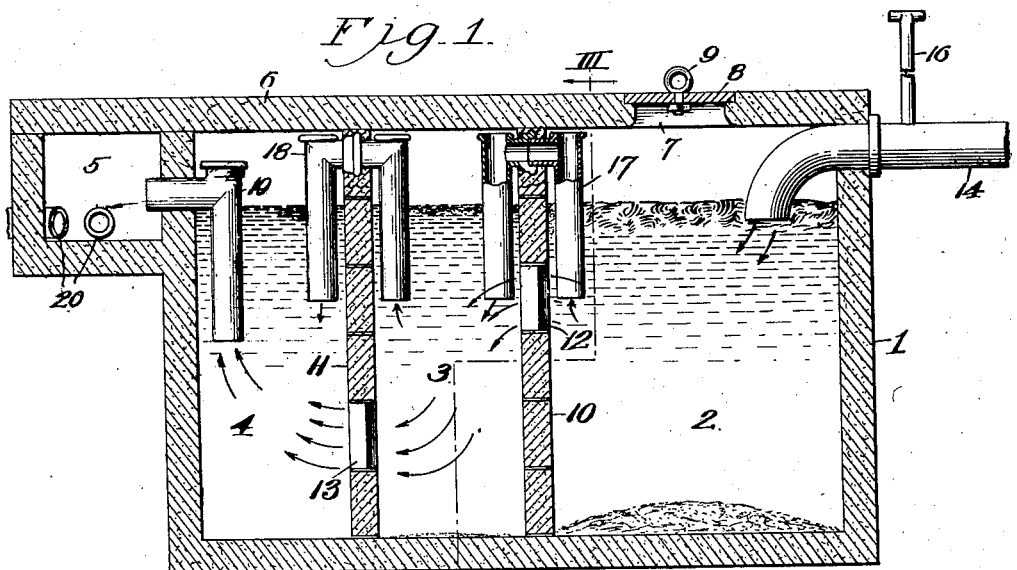
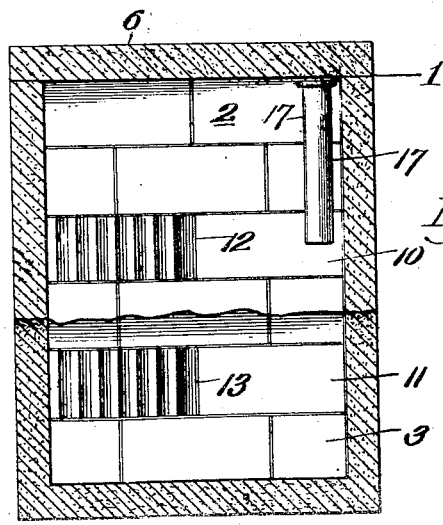
Inventor
Charles A. Kopp.
By Thorpe & Thorpe
Attorneys Patented Mar. 21, 1933

1,902,171

UNITED STATES PATENT OFFICE

CHARLES A. KOPP, OF KANSAS CITY, MISSOURI

SEPTIC TANK

Application filed July 18, 1932. Serial No. 623,123.

This invention relates to septic tanks and has for its object to provide a construction of simple, durable and inexpensive character which can be erected or installed at low cost and which will operate efficiently for a long period of time without danger of clogging.

Another object is to make provision for facilitating the flow and discharge of the liquid constituents of the fecal matters entering the tank and for causing such liquid constituents to follow a course tending to leave the solid substances or matters at a higher level and thereby promote the decomposition of the latter through the agency of anaerobic bacteria which as well known, is not promoted efficiently and rapidly when at a low temperature, this difficulty being especially noticeable in the winter season with conventional type septic tanks.
With the objects mentioned in view, the invention consists in certain novel and useful features of construction and combinations of parts as hereinafter described and claimed, and in order that it may be fully understood, reference is to be had to the accompanying drawing, in which:

Figure 1 is a vertical section of a septic tank embodying the invention, the section being taken on the line I—I of Figure 2.
Figure 2 is a top plan view of the septic tank with the top omitted and with certain partitions partly in plan and partly in section.

Figure 3 is a vertical cross section on the irregular line III—III of Figure 1, to disclose, in face view, the two strainers in the partitions for relative quick passage of liquid matters through the body portion of the tank in a generally downward though circuitous course.

Referring to the drawing in detail, 1 indicates a tank divided into full depth compartments 2, 3 and 4, and a shallow top compartment 5, a cover 6 closing all of the compartments with a gas-tight relation, and over compartment 2, having a man-hole 7 closed by a removable plate 8 equipped with a handle 9.

The tank and its cover 6 may be of cement or the like and both are impervious to the passage of gas or water. The partitions 10 and 11 are preferably formed of cement blocks or bricks through which water cannot pass, but each is equipped with a strainer. The strainer 12 is disposed in the partition 10 in a higher plane than strainer 13 in partition 11, and both are of such character as to direct the liquid laterally for the purpose of retarding the speed of flow and thereby minimize the chance of organic matter passing through the strainers, as the decomposition of organic matter in the compartment 2 will thereby be made more effective and rapid.

The sewage enters the chamber 2 through the pipe or conduit 14 and the discharge end of the latter extends downwardly as at 15, the supply pipe or conduit, exterior to the tank by preference, having a tube 16 venting into the atmosphere.

In the event the strainer 12 should be clogged by a rag or otherwise, provision is made for the passage of liquid from compartment 2 to compartment 3 by an inverted U-shaped overflow tube 17, and like provision is made by a similar tube 18 for passage of liquid from compartment 3 to compartment 4, in the event strainer 13 should become clogged, the provision of the said tubes guarding against backflow into basements or the like should either or both strainers cease to function.

For the discharge of liquid constituents in clarified condition, an inverted L-pipe 19, or the like, establishes communication between compartments 4 and 5, and from the latter the clarified liquid flows into one or more outlet pipes 20 so that through aerobic bacterial action, purification may occur if the pipes are properly located.

The sewage and liquid will stand at the level of the discharge end of pipe 19 and somewhat above the level of the discharge end of supply pipe 14 so that there shall be no interference with the ready precipitation of heavy constituents to the bottom of compartment 2 in the form of sediment or sludge or with the formation of a crust or layer of organic matter at the top of the body of liquid standing in said compartment and wholly above the lower end of tube 17 where it communicates with said compartment, it being apparent that the retention in compartment 2 of most of the solids facilitates decomposition and liquefaction thereof. However, as low temperature mitigates against rapid decomposition, provision has been made for the ready passage of liquid from compartment 2 into compartment 3, by means of the strainer 12 which will prevent the passage through it of nearly all solid organic matter which may be in suspension, and this free escape of relatively cold liquid, by reason of the position of the strainers, disposes the liquid in compartment 3 initially at a level considerably lower than the crust of organic matter in compartment 2 to minimize the chilling of the crust, this flow of the relatively clear liquid being especially desirable in cold weather as at such time the decomposition is relatively slow.

Any matter in suspension which passes through the strainer into compartment 3 accumulates as a scum at the surface of the liquid in said compartment and will soon decompose, the colder liquid, practically clear, passing through the lower strainer 13 into compartment 4, where its chilling effect is not appreciable on the body of matter in compartment 2, or on the small accumulation of scum in compartment 3. As additional sewage enters compartment 2, the level of the contents is raised only momentarily as an equal volume of the clarified liquid of compartment 4 is displaced and escapes into compartment 5 and passes off through the distribution pipe or pipes 20.

In the event the strainer 12 becomes clogged by a rag or the like the surplus liquid will escape by way of tube 17, and should the liquid rise in compartment 3 to a sufficient height and at such a rapid rate that the strainer 13 cannot accommodate it instantly, the surplus will flow off through tube 18, it being noted that the said tubes are open at the top to serve as vents and facilitate the flow. It will be noted that the strainers are so disposed as to insure a tortuous flow and hence retardation of travel of the liquid through compartments 3 and 4, to give more time for decomposition and liquefaction and a better opportunity for the colder liquid to more readily settle toward the bottom of the tank and thereby insure a more efficient decomposition or liquefaction of the organic constituents entering the tank.

From the above description, it will be evident that while I have described a construction embodying the features of advantage set forth as desirable I reserve the right to all changes within the spirit and scope of the appended claim.

I claim:—

A septic tank divided by full height partitions impervious to the passage of liquid, into a plurality of compartments, a sewage supply pipe communicating with one end compartment, an elevated compartment, an escape pipe for conducting liquid from the other end compartment into the elevated compartment, the end of said pipe where it communicates with said end compartment being at a lower level than the sewage supply pipe, overflow pipes in the partitions respectively and connecting the adjacent compartments, the lower ends of said overflow pipes being lower than the sewage supply pipe and their upper ends open for venting purposes within the respective adjacent compartments, a vent for the said supply pipe exterior to the tank, strainers in the partitions respectively at different levels and below the said various pipes, the strainer connecting the compartment into which the sewage is discharged occupying a higher plane than the other strainer.

In testimony whereof I affix my signature.

CHARLES A. KOPP.